United States Patent
Taga

[15] 3,689,612
[45] Sept. 5, 1972

[54] METHOD FOR EXTRUDING INTO CAVITIES DEFINED BY A FIXED PLATE AND MOVING METAL MOLDS A FOAMABLE ON NON-FOAMABLE THERMOPLASTIC POLYMERIC RESIN

[72] Inventor: Jun Taga, 5664, Ikuta, Kanagawa Prefecture, Kawasaki, Japan

[22] Filed: May 12, 1970

[21] Appl. No.: 36,518

[30] Foreign Application Priority Data

May 14, 1969 Japan ................44/036524

[52] U.S. Cl. ..................264/48, 18/4 B, 18/5 A, 18/5 P, 18/21, 264/167, 264/237, 264/297, 264/327, 264/328, 264/DIG. 14, 264/DIG. 61
[51] Int. Cl. ...................B29f 1/00, B29d 27/00
[58] Field of Search......264/48, 51, 53, 54, 251, 328, 264/329, 237, 327, DIG. 14, DIG. 61, 167; 18/4 B, 5 A, 5 P, 21

[56] References Cited

UNITED STATES PATENTS

| | | | |
|---|---|---|---|
| 2,315,366 | 3/1943 | Daley et al. | 264/51 |
| 2,693,007 | 11/1954 | Rhodes | 264/297 X |
| 3,196,196 | 7/1965 | Burbank | 264/251 X |
| 2,893,877 | 7/1959 | Nickolls | 264/48 X |
| 3,011,217 | 12/1961 | Carlson | 264/53 |
| 3,298,064 | 1/1967 | Taga | 18/14 A |
| 3,515,778 | 6/1970 | Fields et al. | 264/216 UX |

FOREIGN PATENTS OR APPLICATIONS

| | | | |
|---|---|---|---|
| 705,296 | 3/1965 | Canada | 264/54 |

OTHER PUBLICATIONS

Taga, Jun "New Japanese Extrusion Moulding Process." In British Plastics, October, 1963, pp. 566–569.
International Plastics Engineering. " The Taga Process." Vol. 4, No. 12, December, 1964, pp. 371–376

*Primary Examiner*—Philip E. Anderson
*Attorney*—Irons, Sears, Staas, Halsey & Santorelli

[57] ABSTRACT

A method for molding synthetic thermoplastic polymeric organic resin which also may be foamable comprising successively placing under pressure the, molten resin which is extruded from a die of an extruder in cavities to be formed between the die and continuously moving plural metallic moulds, and preventing a leakage of the molten resin out of the cavity in rear of the die by means of one or more barriers which are movable simultaneously or independently with each other, said barrier being adapted to be, at its tip end, always in contact with an inner floor of the metallic mould or held leaving a slight space therefrom and being adjacent to the rear portion of a die orifice thereby to enable the flow line of resin to be substantially perpendicular in relation to the direction of movement of the metallic mould and thus to be short and an apparatus for performing said method. There is also disclosed an apparatus as mentioned above, wherein in front of the die is provided a pressing cooling roll or endless belt having a function of adjusting a cooling temperature thereby to effect the solidification of the molten resin while pressing and cooling, whereupon the molded product is withdrawn. Thereby, the thermoplastic materials can be continuously molded without leakage of materials to give a molded article having excellent properties, especially stress-free property.

9 Claims, 12 Drawing Figures

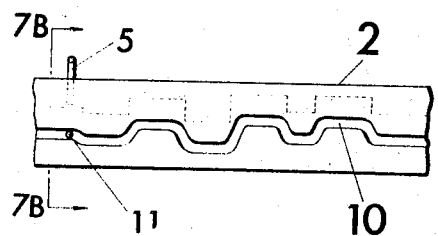
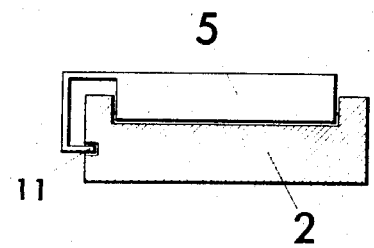
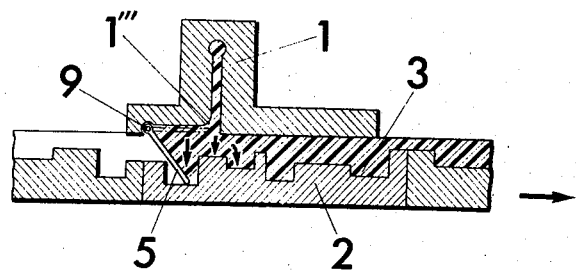
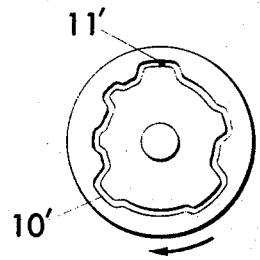
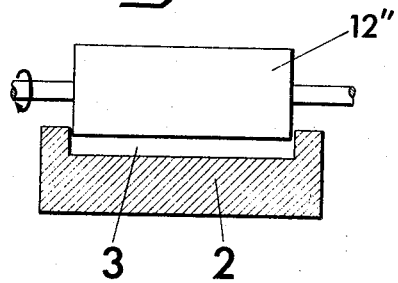

METHOD FOR EXTRUDING INTO CAVITIES DEFINED BY A FIXED PLATE AND MOVING METAL MOLDS A FOAMABLE ON NON-FOAMABLE THERMOPLASTIC POLYMERIC RESIN

This invention relates to a method for molding thermoplastic materials, and more particularly to a method for molding thermoplastic materials which comprises successively putting, under pressure, molten material which is extruded from a die of an extruder in cavities to be formed between the die and continuously moving plural moulds to form a moulding.

The present invention is concerned with improvements in the molding process or method disclosed in the journal "British Plastics" published in October, 1963, Vol. 36, No.10, pages 566 – 569, and, in particular, provides a method for producing an elongate flat plate-like moulding by employing an upper half of die shown in the first picture in the journal on page 567. The invention disclosed in the above-mentioned journal has been patented in the U.S.A. and Great Britain respectively under U.S. Pat. No.3,298,064 and British Pat. No. 1,032,691.

In the process of the above-mentioned prior invention, however, there is such a disadvantage that in case where resins whose melts have relatively low viscosities, such as polyolefins, polyamides, etc., are molded, where a moulding with a relatively great ratio of convex to concave which needs an employment of high-pressure molding is intended or where a relatively thick moulding is intended, the resin melt is liable to run over or leak out in front and in rear of a die, leading to an unfavorable molding. As a result of this, the internal stress of the moulding increases, resulting in lowering of the impact strength of product. Furthermore, in case a plastic foam is molded, the above-mentioned leakage of molten material out of the cavity is accompanied by the gas being scattered and lost, resulting in an unevenly foamed product.

In order to eliminate such disadvantages or drawbacks the present invention has been made.

Essentially, according to the present invention, there is provided a method for molding thermoplastic materials wherein a barrier member is fitted to a die for preventing the leakage of molten material out of the cavity.

Therefore it is an object of the present invention provide a method for molding thermoplastic materials which can continuously mold thermoplastic materials without leakage of molten materials.

It is another object of the present invention to provide a method as described above, in which the barrier is fitted to a die.

It is a further object of the present invention to provide a method as described above, in which the barrier is longitudinally movable.

It is a still further object of the present invention to provide for the utilization of an apparatus for performing a method for molding thermoplastic materials as described above.

It is a still further object of the present invention to provide for the utilization of an apparatus of the character described, which is simple in structure, and can be manufactured and sold at a reasonable cost.

The foregoing and other objects, features and advantages will be apparent from the following description taken in connection with the accompanying drawings in which:

FIG. 6 is a longitudinal sectional view of another embodiment of the present invention;

FIG. 7 shows still another embodiment of the present invention, in which FIG. 7A is a side view and FIG. 7B is a transverse sectional view taken along the line 7B — 7B of FIG. 7A;

FIG. 8 is a front view of a cam mechanism member which may be substituted for a groove cam employed in the embodiment shown in FIG. 7;

FIG. 11 shows an independent roll with a sectional view of mould, which may be employed in addition to a roller belt shown in FIG. 10.

In FIGS. 1 to 11, like portions or parts are designated with like numerals.

Figure 1:
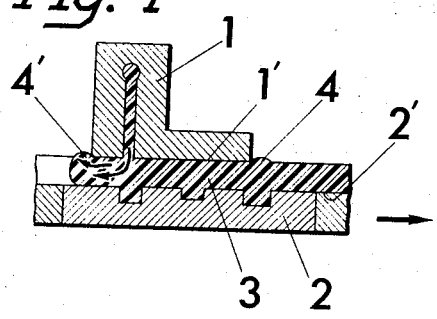
FIG. 1 is a longitudinal sectional view of a conventional molding unit consisting of a die and a train of moulds, shown with other moulds than one mould cutaway.

Referring to FIG. 1, there is shown a conventional molding unit comprising a die 1 and a train of metallic moulds which continuously move in the direction shown by an arrow (in FIG., only one mould 2 is shown). In the process employing such conventional molding unit, in case where resins whose melts have relatively low viscosities, such as polyolefins, polyamides, etc., are molded, where a moulding with a relatively large ratio of convex to concave which needs an employment of high-pressure molding is intended or where a relatively thick moulding is intended, the resin melt is disadvantageously liable to run over or leak out of a cavity 3 in front and in rear of a die 1 (as shown by numerals 4 and 4'). Such condition is deemed to be similar to the mechanism in the conventional extruder, when the passage of resin in a die is put into consideration. Stated illustratively, a bottom surface 1' of the die 1 cooperates with an upper surface 2' of the metallic mould 2 to form the cavity 3 which is a passage for resin melt: through this passage the resin melt is extruded forwards and backwards as shown numerals 4 and 4'. When, between an extrusion pressure P and a resistance $\Delta P$ to resin melt flowing in the cavity, there is a relation $P > \Delta P$, the resin melt will run over or leak out of cavity in the front and rear portions thereof.

Figure 2:
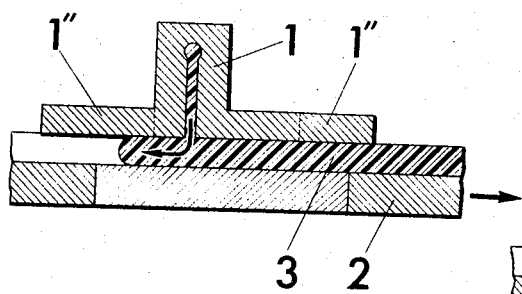
FIG. 2 is a longitudinal sectional view of another conventional molding unit which may advantageously be substituted for the one of FIG. 1.

In order to prevent such unfavorable leakage of the resin melt, there may, of course, be formed relatively elongate ears 1″, 1″ which extend from the die 1 at its both ends so that the resistance $\Delta P$ to resin flowing in the cavity (as shown in FIG. 2). Furthermore, with a screw design (disclosed in the journal "International Plastic Engineering," published in December, 1964, Vol. 4, No.12, pages 371 – 376) in addition to the above-mentioned elongate ears, it is possible to some extent that the resin melt is put, under pressure, into a cavity, while preventing the leakage of resin melt, to obtain a moulding or molded article. As a result of a study by the present inventor, however, it has been found that it is difficult to such process as mentioned above apply to the case where resin whose melt has a relatively low viscosity is molded, where a moulding or molded article with a relatively large ratio of convex to concave is intended or where a relatively thick moulding is intended.

Figure 3:
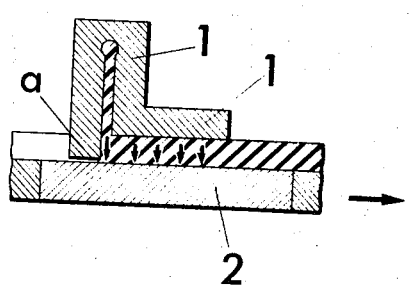
FIG. 3 is a longitudinal sectional view of still another conventional molding unit which may advantageously be substituted for the one of FIG. 1 or FIG. 2.
Figure 4:
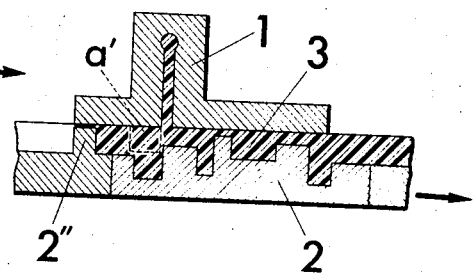
FIG. 4 is a longitudinal sectional view of a molding unit of which the moulds have an inner floor with convex and concave, explaining the difficulty encountered when the die of the shape shown in FIG. 3 is employed.

As a measure to solve the problem, as shown in FIG. 3, it may be considered that the rear portion of the die 1 is downwardly extended to form a barrier *a* thereby to prevent the leakage of resin melt. In case the metallic mould has not a flat floor but a convexed-and concaved-floor (as shown in FIG. 4), it is impossible to employ such downwardly extended barrier *a′* formed integrally with the die because of a hindrance by a convex or projection 2″.

Accordingly, the barrier of the invention has been so devised that it may be movable and it may be always in contact with the inner floor of the metallic mould or may always face the inner floor with a slight spacing therebetween.

Figure 5:
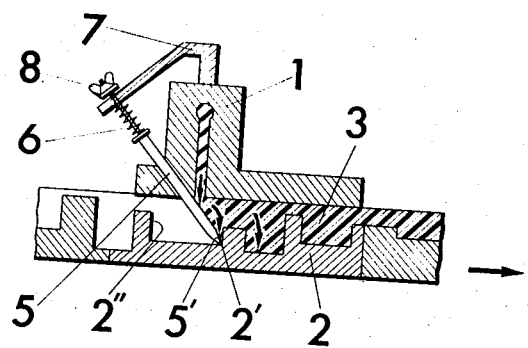
FIG. 5 is a longitudinal sectional view of an embodiment of the present invention.

Referring now to FIG. 5, there is shown an embodiment of the present invention. Numeral 5 designates a movable barrier fitted in rear of the die orifice. The tip end 5′ of the barrier 5 is adapted to be always pressed over an inner floor 2′ by the action of spring 6 which is adjusted by means of a wing nut 8. The barrier 5 is fitted by means of a bracket 7 and held inclinedly at a some angle so that it may smoothly move up-and downwardly in accordance with the movement of the convexes or projections 2″ of the metallic mould. Alternatively, the barrier 5 may be so constructed as depicted in FIG. 6. A barrier 5 in FIG. 6 is hingely fitted to the die 1 at its lower portion. In this case it is preferred to make a tapered portion 1‴ as depicted so that the extrusion pressure may act so as to press the barrier 5 downwardly.

The barrier shown in FIG. 5 moves up-and downwardly utilizing an inclined surface; and hence, it can be considered to be a cam mechanism. Therefore, in substitution for the structures shown in FIGS. 5 and 6, there may be employed, as depicted in FIG. 7, another structure in which a groove cam 10 is formed on the side of the metallic mould (as shown in FIG. 7A) and a cam follower 11 is connected to a barrier 5. Alternatively, as shown in FIG. 8, there may, of course, be employed an independently installed cam mechanism including a groove cam 10′ and a cam follower which is connected to a barrier 5.

According to the present invention, the barrier not only serves as a means for preventing the leakage of resin melt but also is useful for greatly improve the properties of the molded article. Stated illustratively, the direction of resin flow (as depicted by arrow in the resin melt in FIG. 1) always forms a flow line of the melt, resulting in orientation of a moulding. In general, the longer the flow line, the larger becomes an orientation degree, leading to an increasing internal stress, whereby the impact strength is lowered. The provision of the barrier enables the flow line to become vertical and short as depicted by arrow in FIGS. 3 and 5. Accordingly, the properties of the molded article can be considerably improved. In addition, it is to be noted that, in molding a plastic foam, the provision of the barrier enables the scattering and loss of gas to be prevented thereby to advantageously effect the foaming successively whereby the product with an even foaming can be obtained. Without the barrier the molding pressure can not be maintained constant, the foaming rate is not constant, especially when the depth of the cavity is uneven and when a relatively thick moulding is intended; accordingly, a good product can not be obtained. Furthermore, it is noted that a single or a plurality of barriers which move simultaneously or independently may be employed according to the desired shape of the molded article.

For preventing leakage of resin melt to the front of die the barrier as used for preventing the leakage to the rear of dice can not be employed. According to the present invention, the forward portion of die which is extended forwardly has a tip end, which is closely adjacent to a cooling pressing roll or a pressing endless belt, whereby the leakage of resin to the front of die can successfully be avoided (see FIGS. 9 and 10). This resin leakage prevention is somewhat different in mechanism from that of the rear portion in which the leakage of resin melt is mechanically sealed by means of a barrier. Stated illustratively, the leakage preventing mechanism in front of the die includes firstly cooling the surface of resin melt, increasing the viscosity of the melt and increasing the resistance to resin flowing thereby to prevent the leakage. Therefore, the cooling roll system may vary depending upon the kind of the molded article; that is, mono-or multiple-roll system may be employed, and the roll may be moved depending on the motion of the metallic mould or may be independently moved at the same speed by an actuator. The adjustment of the temperature of the cooling pressing roll may be effected by cycling a cooling liquid in the same manner as in the roll for calendering polyvinyl chloride etc. In this connection, it is preferable to be able to adjust the temperature of each roll independently. As the cooling liquid, there may generally be employed cooled water or warm water. In using a endless belt, the cooling can be effected by adjusting the temperature of each roll in the same manner as mentioned above.

The other noticeable object of the cooling pressing roll is to eliminate the stress of the molded article. Especially in case a crystalline resin is molded, the problem of stress is very important. In the case of crystalline resin, its crystallization solidification begins on cooling. Yet, since the metallic mould is cooled to a constant temperature, the solidification of resin begins from the portion which is in contact with the metallic mould immediately after the resin melt is put, under pressure, in the cavity, and at the same time the shrinking occurs. In this instance, since the temperature of metallic mould is considerably low as compared with that of the resin, the resin which is in contact with the metallic mould is rapidly cooled and over-cooled. On the contrary to this, the open surface of the resin, namely the resin portion which is not in contact with the metallic mould is gradually cooled and fully crystallized when the air cooling, enforcing cooling or natural cooling is employed without employing the above-mentioned cooling pressing system. Accordingly, the great shrinkage of resin occurs. As a result of this, the molded article is caused to greatly bend with the inside of the gradually cooled surface to give a crooked moulding. This is an external stress but, at the same time, there is also an internal stress. In molding a plastic foam also, this phenomena occur similarly. In case of the injection molding, the resin melt is sealed in a cavity and cooling is effected from the whole surrounding. Therefore, such stress as described above hardly occurs.

Figure 9:
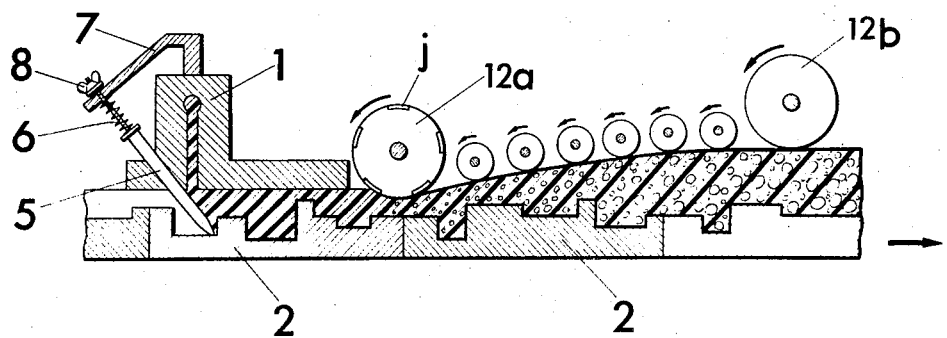
FIG. 9 is a longitudinal sectional view of still another embodiment of the present invention, in which a roll cooling system and a stamping roll are employed.
Figure 10:
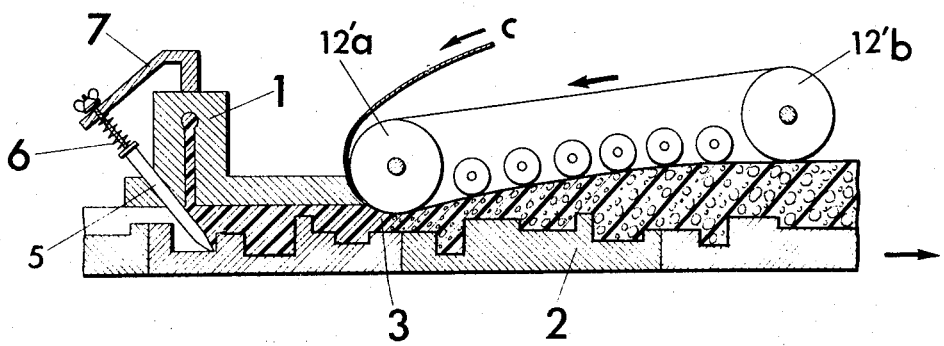
FIG. 10 is a longitudinal sectional view of still another embodiment of the present invention, in which an endless belt carried by rolls is employed for cooling and an additional material is inserted by means of a first roll.

Such crooking of the product due to stress can be prevented by maintaining the cooling conditions of the resin faces respectively in contact with the metallic mould and the roll or belt at the same condition. In order to attain the purpose, it is essential to adjust the temperature of each cooling pressing roll or a belt. In FIG. 9, numerals 12a and 12b designate main cooling pressing rolls, wherebetween there are provided a number of auxiliary rolls. In FIG. 10, a belt is employed for the same purpose and carried by guide rolls 12'a and 12'b.

Meanwhile, in molding a plastic foam, the formation of a skin layer is indispensable for improving the appearance and strength of the product. In case of such molding, a skin layer is formed on the surface of resin which contacts the metallic mould. Since a skin layer is formed in a portion where the resin melt is cooled under pressure, it is not formed in the open surface of resin. The employment of the above-mentioned pressing cooling roll or belt serves to depress foaming and form a skin layer. Whereupon, by gradually widening the space between the face of metallic mould and the roll or belt as illustrated in FIGS. 9 and 10, the internal resin which remains molten and has a foaming ability can be effectively foamed. The thickness of skin layer is determined depending on the temperature of the surface of roll and the period of time of pressing cooling the surface of the resin melt. The foaming rate is determined depending upon the widening rate of the space between the face of metallic mould and the roll or belt. In FIGS. 9 and 10, a relatively wide line indicates the skin layer formed.

When in the roll or belt is engraved a pattern or the like, for example, as designated by character j in FIG. 9, the product can have such engraving. Moreover, the roll may be used as a printing roll to make an anastatic printing, intaglio printing or lithoprinting on the molded article simultaneously. As shown in FIG. 10 at c, an additional material, for example printed paper may be inserted by means of the roll 12'a to form a laminated article.

Furthermore, it is noted that an independent roll as shown in FIG. 11 at 12'' may be employed for the first-stage pressing cooling and the succeeding-stage pressing cooling operation may be effected by means of a belt. It is advantageous when the plastic foam is moulded that the insertion of additional material is effected at the step between the first-stage and the subsequent stage by using the above-mentioned independent roll.

What is claimed is:

1. A method of molding a synthetic thermoplastic organic polymeric resin comprising:
    A. extruding molten synthetic thermoplastic organic polymeric resin, under pressure, from an orifice in a die into a cavity defined by a stationary surface and a movable mold,
    B. moving said mold in a direction generally parallel to said stationary surface,
    C. preventing leakage of said molten thermoplastic resin out of said cavity at the rear of said stationary surface by means of at least one movable barrier, said barrier extending into said cavity and positioned (i) in proximity to the rear of said stationary surface and (ii) to the rear of, and in proximity to, said orifice in said die, and
    D. moving said barrier so that a portion thereof remains in proximity to an interior surface of said mold.

2. The method of claim 1 in which said molten thermoplastic resin is successively injected into a plurality of continuously moving molds.

3. The method of claim 1 which includes the step of preventing leakage of said molten resin out of said cavity at the forward end of said stationary surface by cooling the surface of said thermoplastic resin, whereby the viscosity and resistance to flow of said thermoplastic resin are increased.

4. The method of claim 1 which includes the step of effecting solidification of said molten resin while subjecting said molten resin to pressing and cooling means positioned in proximity to the front of said stationary surface, whereby a solidified, molded article is obtained.

5. The method of claim 4 which includes the step of subjecting said molten resin to a plurality of successive cooling means.

6. The method of claim 4 in which said resin is a foamable synthetic thermoplastic organic polymeric resin.

7. The method of claim 6 in which the foaming rate is controlled by gradually increasing the width of the space between the face of said mold and said pressing means.

8. The method of claim 7 in which said pressing means is a plurality of successively positioned rolls.

9. The method of claim 7 in which said pressing means is an endless belt.

* * * * *